US007465061B2

(12) United States Patent
Ho et al.

(10) Patent No.: US 7,465,061 B2
(45) Date of Patent: Dec. 16, 2008

(54) ELECTRIC ENERGY STORAGE HAND TWIST TORCH

(75) Inventors: Waiming Ho, Hong Kong (CN); Ming Lee, Hong Kong (CN)

(73) Assignee: Mingle Metal (Shen Zhen) Co. Limited, Shenzhen (CN)

( * ) Notice: Subject to any disclaimer, the term of this patent is extended or adjusted under 35 U.S.C. 154(b) by 162 days.

(21) Appl. No.: 11/277,158

(22) Filed: Mar. 22, 2006

(65) Prior Publication Data

US 2007/0159823 A1 Jul. 12, 2007

(30) Foreign Application Priority Data

Dec. 23, 2005 (CN) .................... 2005 2 0142789 U

(51) Int. Cl.
*B60Q 1/00* (2006.01)

(52) U.S. Cl. ....................... 362/192; 362/183; 362/202; 362/205

(58) Field of Classification Search ................. 362/192, 362/183, 193, 196, 202, 205, 206, 208
See application file for complete search history.

(56) References Cited

U.S. PATENT DOCUMENTS 1,450,500 A * 4/1923 Harvey ........................ 362/192
1,556,492 A * 10/1925 Coleman .................... 362/192
1,624,686 A * 4/1927 Smith ......................... 362/192
1,917,486 A * 7/1933 Beck .......................... 267/156
2,232,605 A * 2/1941 Holmes ....................... 362/192
5,683,168 A * 11/1997 Teig et al. ...................... 362/96
5,839,817 A * 11/1998 Wei ............................ 362/192
5,975,714 A * 11/1999 Vetorino et al. ............. 362/192
2005/0111218 A1* 5/2005 Lee ............................ 362/192
2006/0050504 A1* 3/2006 Mah ........................... 362/192

FOREIGN PATENT DOCUMENTS

CN 1603677 A * 4/2005

OTHER PUBLICATIONS

English Abstract of Chinese Publication CN 1603677A.*
English Abstract of Chinese Publication CN 1603677A dated Apr. 2005.*

* cited by examiner

*Primary Examiner*—Jong-Suk (James) Lee
*Assistant Examiner*—Kevin Spinella
(74) *Attorney, Agent, or Firm*—Buchanan Ingersoll & Rooney PC

(57) ABSTRACT

The present invention provides a spontaneous electric energy storage hand tweak torch, comprising a lamp cap and a cylindrical casing. The casing comprises a front casing and a rear casing capable of being bi-directionally tweaked about an axis. The lamp cap is fixed on the front casing. The interior of the front casing is provided with an electric generator, an energy storage element, a circuit board and a control switch. The exterior of the front casing is provided with a push button corresponding to the control switch. The output end of the electric generator is connected with the input end of the circuit board via a lead. The output end of the circuit board is connected with the energy storage element. The rotating shaft of the electric generator is connected with the rear casing via a gear set. The present invention has a simple and compact structure as well as a regular and uniform profile. Besides, it is convenient to operate and therefore saves labor. Consequently, it has a very prominent operation effect.

11 Claims, 1 Drawing Sheet

ELECTRIC ENERGY STORAGE HAND TWIST TORCH

BACKGROUND OF THE INVENTION

The present invention relates to a household electric appliance, more particularly, to an electric energy storage hand twist torch.

Hand torch is a commonly used temporary illumination appliance. Most of the existing hand torches consist of a lamp cap and a cylindrical casing. The dry batteries within the casing are connected with the bulb within the lamp cap via a lead. The outer surface of the casing is provided thereon with a control switch. This hand torch is widely used because it is simple in structure and convenient to operate and therefore it has occupied the market over a long period of time. However, since it is powered by dry batteries, the replacement rate of batteries is considerably high. This will not only increase the use-cost but also will cause considerably difficulty in recycling scrap batteries. A little carelessness will cause serious environment pollution. Therefore, a torch powered by an accumulator has been developed. The accumulator of this torch can be charged by manual operation. Although it avoids defects of the torch powered by dry batteries, it still has structural defects. The main expression is found in that the electric generator needs being driven by a rock arm. It not only has a complicated structure and a strange profile but also is inconvenient to operate. Accordingly, the effect of use is not desirable.

SUMMARY OF THE INVENTION

In view of the shortages in the prior art, the object of the present invention is to provide an electric energy storage hand twist torch, which has a simple structure and is convenient to operate.

In order to achieve the aforesaid object, the following technical solution is adopted in the present invention: an electric energy storage hand twist torch comprises a lamp cap and a cylindrical casing, wherein the casing comprises a front casing and a rear casing capable of being bi-directionally twisted about an axis, wherein the lamp cap is fixed on the front casing, wherein the interior of the front casing is provided with an electric generator, an energy storage element, a circuit board and a control switch, while the exterior of the front casing is provided with a push button corresponding to the control switch, and wherein the output end of the electric generator is connected with the input end of the circuit board via a lead; the output end of the circuit board is connected with the energy storage element; and the rotating shaft of the electric generator is connected with the rear casing via a gear set.

The front casing is successively divided into a lamp cap mounting chamber, an energy storage circuit mounting chamber, an electric generator mounting chamber and a gear set mounting chamber, from front to back.

The front casing and rear casing are encased one another, wherein the front casino has at the tail portion a thinner cylinder adapted to the internal diameter of the rear casing with the inner wall thereof in a stepped shape adapted to the gear set, and the bottom wall of the rear casing is provided thereon with an annular protuberance adapted to the internal diameter of the end portion of said cylinder.

The energy storage element and circuit board are fixed within the front casing via a frame, wherein the control switch is fixed on the circuit board, and the push button is disposed over the control switch and protrudes outside from the push button hole in the sidewall of the front casing.

The circuit board is provided thereon with a rectification circuit for converting alternating current from the electrical generator into direct current.

The circuit board is provided thereon with a voltage regulator circuit for protecting the light emitting element and the energy storage element.

The frame is integrally formed with a condensation shade, wherein the energy storage element and the frame are provided therebetween with an elastic pad.

The electric generator is fixed within the front casing via a baffle opened with a mounting hole therein.

The lamp cap comprises a condensation shade, a lens and a lamp cap cover, wherein the condensation shade is provided in the front port of the front casing, and the lamp cap is in an annular shape and screw-connected with the front casing to press the lens tightly against the opening of the condensation shade.

The lamp cap cover comprises an inner annular body and an outer annular body with a V-shaped cross-section, wherein the outer annular body is longer and screw-connected with the casing, while the inner annular body is shorter and pressed against the lens tightly, and a seal ring is provided between the annular contact surfaces of the lens and the condensation shade.

The whole body of the hand torch of the present invention is substantially in the shape of a cylinder. It consists of a front portion and a rear portion. Said two portions are capable of being twisted relative to each other about the axis of the cylinder. The rear casing is twisted to drive the gear set connected therewith to rotate. The gear set still performs the function of amplifying rotation speed besides driving the electric generator connected therewith to rotate as a driving member. The rotation of the electric generator generates alternating current which is transferred to the circuit board via a lead. A direct current is output after rectification to charge the energy storage element. After the energy storage element is fully charged, push the push button to close the switch to put through the circuit between the energy storage element and the light emitting element to allow the light emitting element to shine. Different from the existing rock arm type energy storage hand torch, the electricity generation manner of the present invention is to twist the outer casing of the torch directly to drive the electric generator to rotate. The rotation direction is to directly rotate the casing of the torch bi-directionally about axis thereof without need of rotating a rock arm within a plane. Therefore, it has simple and compact structure as well as a regular and uniform profile. Besides, it is convenient to operate and therefore saves labor. Consequently, it has a very prominent operation effect.

DETAILED DESCRIPTION OF THE EMBODIMENTS

Figure 1:
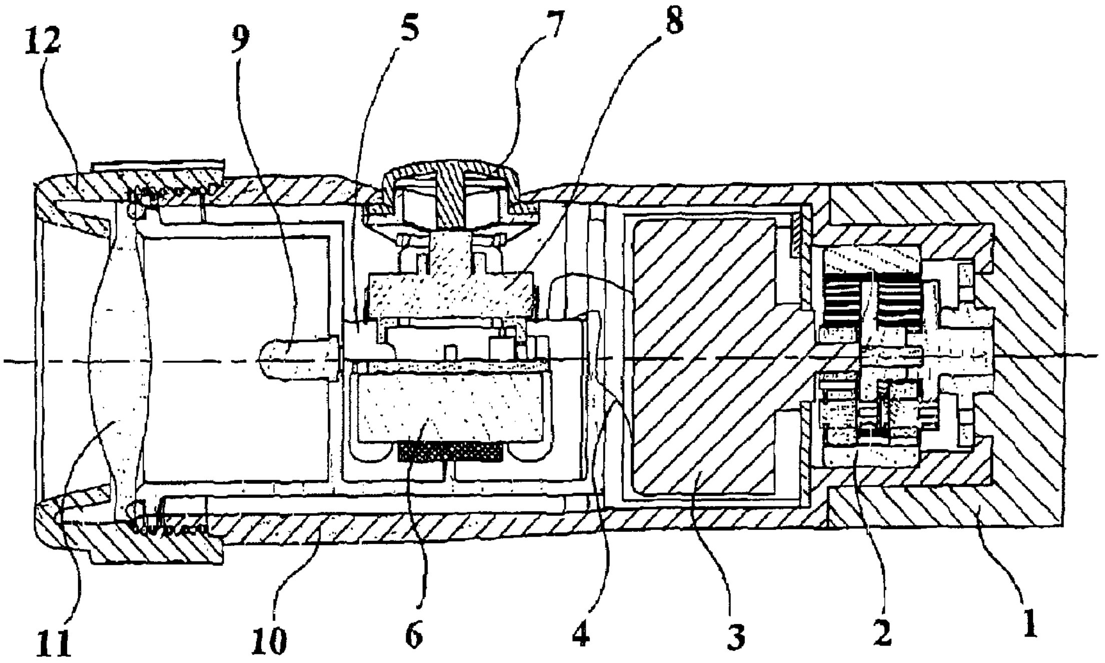
FIG. 1 is a schematic sectional view of the present invention.

The present invention will be further described in details hereinafter with reference to the FIGURE.

The reference signs are explained as follows:

1—rear casing
2—planetary gear set
3—electric generator
4—lead

5—circuit board

6—energy storage element

7—push button

8—switch

9—LED lamp

10—front casing

11—lens

12—lamp cap cover

As shown in FIG. 1, both ends of the front casing 10 are through. The sidewall of the front casing 10 is opened with a push button hole, while the tail end is in the shape of a thinner cylinder so that it can be inserted into the rear casing to allow the two casings to be twisted to rotate with respect to each other. The inner wall of the cylinder is in the shape of gradually retracted steps to facilitate mounting of the planetary gear set. The inner chamber of the front casing is successively divided into a lamp cap mounting chamber, an energy storage circuit mounting chamber, an electric generator mounting chamber and a planetary gear set mounting chamber, from front to back. The external diameter of the rear casing 1 is consistent with the front casing 10, while the internal diameter is adapted to cylinder at the end of the front casing, and the bottom wall of the rear casing is provided with an annular protuberance adapted to the internal diameter of the end of said cylinder. The front casing 10 and rear caging 1 are encased in one another and capable of being bi-directionally twisted about an axis. The power input end of the planetary gear set 2 is connected with the bottom wall of the rear casing 1, while the power output end is connected with the rotation axis of the electric generator 3. The electric generator 3 is fixed within the front casing 10 via a baffle opened with a mounting hole therein. The baffle is pressed tightly against the steps within the casing. The electric generator 3 is connected with the circuit board 5 via a lead, and then the circuit board is connected with the energy storage element 6. The circuit board is provided thereon with a rectification circuit for converting alternating current from the electric generator into direct current, and a voltage regulator circuit for protecting the light emitting element and the energy storage element. The energy storage element 6 and circuit board 5 are fixed within the front casing via a frame. The switch 8 is fixed on the circuit board 5. The push button 7 is disposed over the control switch and protrudes outside from through hole in the sidewall of the front casing. The frame is integrally formed with the condensation shade, wherein said energy storage element 6 and the frame are provided therebetween with an elastic pad. The condensation shade is provided in the front port of the front casing. The outer circumferential surface of the front port is provided with external thread. The lamp cap cover 12 comprises an inner annular body and an outer annular body with a V-shaped cross-section, wherein the outer Annular body is longer and screw-connected with the front casing, while the inner annular body is shorter and pressed the lens 11 tightly against the opening of the condensation shade. A seal ring is provided between the annular contact surfaces of the lens 11 and the condensation shade.

This product is a brand new electric energy storage hand twist torch. The electric generator therein is driven to rotate by bi-directionally twisting the tail portion of the casing of the hand torch about the axis of the hand torch so as to convert kinetic energy into electric energy and store it for use in later illumination.

The present invention is not limited to the aforesaid preferred embodiments. Any one can obtain other forms of products under the inspiration of this invention, for example adopting different kinds of gear sets, or adopting other rotation structures for the front and rear casings. However, no matter what changes are made to the shape or structure, any energy storage hand torch falls within the scope of protection of this invention as long as its electric generator is driven by relative rotation of the front and rear casings.

What is claimed is:

1. An electric energy storage hand twist torch, comprising: a lamp cap and a casing having a central axis, wherein the casing includes a front casing and a rear casing coaxially and rotatably mounted to a rear side of the front casing for bi-directionally twisting relative to one another about the central axis, and the lamp cap is fixed on the front casing, wherein the interior of the front casing is provided with an electric generator including a rotating shaft coaxial with the central axis of the casing, an energy storage element, a circuit board and a control switch, while the exterior of the front casing is provided with a push button corresponding to the control switch, and wherein the output end of the electric generator is connected with the input end of the circuit board via a lead; the output end of the circuit board is connected with the energy storage element; and wherein the rotating shaft of the electric generator is connected with the rear casing via a planetary gear set, the planetary gear set including a power input end connected to a bottom wall of the rear casing and a power output end connected to the rotating shaft of the electric generator, whereby the electric generator is actuated by the rear casing via the planetary gear set upon bi-direction twisting of the rear casing relative to the front casing about the central axis to generate electric energy and to store the electric energy in the energy storage element.

2. An electric energy storage hand twist torch according to claim 1, wherein the front casing is successively divided into a lamp cap mounting chamber, an energy storage circuit mounting chamber, an electric generator mounting chamber and a gear set mounting chamber, from front to back.

3. An electric energy storage hand twist torch according to claim 1, wherein the front casing has at the tail portion a thinner cylinder adapted to the internal diameter of the rear casing with the inner wall thereof in a stepped shape adapted to the gear set, and the bottom wall of the rear casing is provided with an annular protuberance adapted to the internal diameter of the end portion of the cylinder.

4. An electric energy storage hand twist torch according to claim 1, wherein the energy storage element and the circuit board are fixed within the front casing via a frame, wherein the control switch is fixed on the circuit board, and the push button is disposed over the control switch and protrudes outside from the push button hole in the sidewall of the front casing.

5. An electric energy storage hand twist torch according to claim 4, wherein the circuit board is provided thereon with a rectification circuit for converting alternating current from the electric generator into direct current.

6. An electric energy storage hand twist torch according to claim 5, wherein the circuit board is provided thereon with a voltage regulator circuit for protecting the light emitting element and the energy storage element.

7. An electric energy storage hand twist torch according to claim 6, wherein the frame is integrally formed with a condensation shade, and wherein the energy storage element and the frame are provided therebetween with an elastic pad.

8. An electric energy storage hand twist torch according to claim 1, wherein the electric generator is fixed within the front casing via a baffle opened with mounting hole therein.

9. An electric energy storage hand twist torch according to claim 1, wherein the lamp cap comprises a condensation shade, a lens and a lamp cap cover, wherein the condensation shade is provided in the front port of front casing, and the lamp cap cover is in an annular shape screw-connected with the front casing to press the lens tightly against the opening of the condensation shade.

10. An electric energy storage hand twist torch according to claim 9, wherein the lamp cap cover comprises an inner annular body and an outer annular body with a V-shaped cross-section, wherein the outer annular body is longer and screw-connected with the casing; the inner annular body is shorter and pressed against the lens tightly; and a seal ring is provided between the annular contact surfaces of the lens and the condensation shade.

11. An electric energy storage hand twist torch according to claim 1, wherein the casing is cylindrical.

* * * * *